Figure 1:
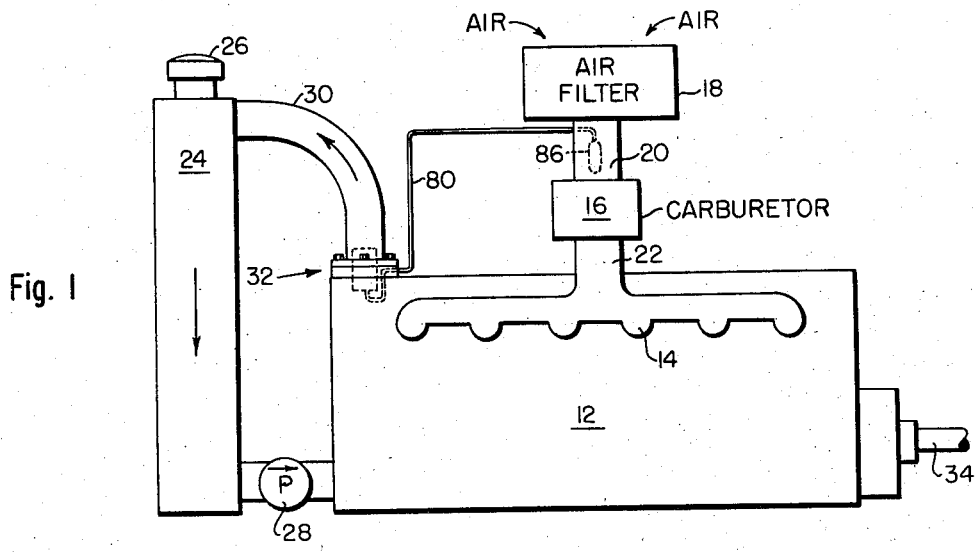

April 28, 1959  J. A. WOODS  2,884,198
TEMPERATURE CONTROL VALVE
Filed April 18, 1956

INVENTOR.
JAMES A. WOODS
BY
ATTORNEYS

United States Patent Office

2,884,198
Patented Apr. 28, 1959

2,884,198

TEMPERATURE CONTROL VALVE

James A. Woods, Cohasset, Mass.

Application April 18, 1956, Serial No. 578,932

5 Claims. (Cl. 236—34)

The present invention relates generally to thermostatic controls, and more particularly to a control for the flow of liquid coolant between the engine block of an internal combustion engine and a heat exchanger external thereto.

A principal object of the invention is to provide a thermostatically controlled valve to be mounted in the coolant circulation system in position to control the rate of coolant flow therethrough, the rate of flow being a function of both the ambient temperature of the air outside the engine block and the coolant temperature within the engine block.

In my copending application Serial No. 520,492, now patent No. 2,816,711, filed July 7, 1955, I disclose a block thermostat of the general type indicated above, in which I provide a single hermetically sealed system filled with thermostatic liquid, this liquid being operative through a mechanical transducer to move the control valve. It is well known that thermostatic liquids commonly used in systems like that described in said application can provide only a limited volumetric change per degree of temperature change. Consequently movements induced in the valve in response to temperature changes can be appreciable only if a suitable transducer is provided. Such a transducer must convert the relatively small volumetric change of the thermal liquid to a relatively large linear movement of an output member operatively engaged with the valve.

It is also well known that various crystalline solids, especially wax, experience a relatively great volumetric change per degree of temperature change as they pass through a so-called "transition range" of temperatures, this range being marked at one extremity by the maximum temperature at which the material is completely solid, and at the other extremity by the minimum temperature at which it is completely liquid.

The relatively large thermal response of wax is now widely utilized in conventional block thermostat controls. For this application suitable formulations have been developed that will cause the wax to pass through its transition range at those temperatures of the engine coolant within which the valve is normally operative from the closed to the "full open" position. Thus a typical wax may have a transition range of approximately 30° F., melting in the range from 140° F. to approximately 170° F. With such a fill, the valve is typically arranged barely to open at the lower end of the range and to become wide open upon the coolant temperature reaching the upper end thereof.

It is a further object of this invention to utilize the desirable responsive properties of a wax or similar crystalline solid as a thermostatic material, while yet including provision for ambient temperature control.

With the above and other objects in view, the features of the invention include a thermostatic system having two thermal fills, namely, a crystalline solid fill responsive solely to the circulating coolant temperature and a thermal liquid fill responsive to the ambient temperature of the air external to the engine block. The thermal system therefore has a total response, as measured by the displacement of the valve member relative to its seat, comprising a substantially linear response over the entire range from the lowest ambient temperature to the highest coolant temperature, superimposed additively upon a sharply increased response to coolant temperatures within a predetermined transition range.

Another feature of the invention resides in the achievement of the desirable properties of an ambient temperature-compensated block thermostat by means of a relatively small and inexpensive structure, utilizing relatively small quantities of thermostatic fill material to accomplish the desired motion of the control valve. The cost savings incident to the small size and low fill content are accompanied by the further advantage of greater responsiveness to fluctuations in temperature.

Figure 2:
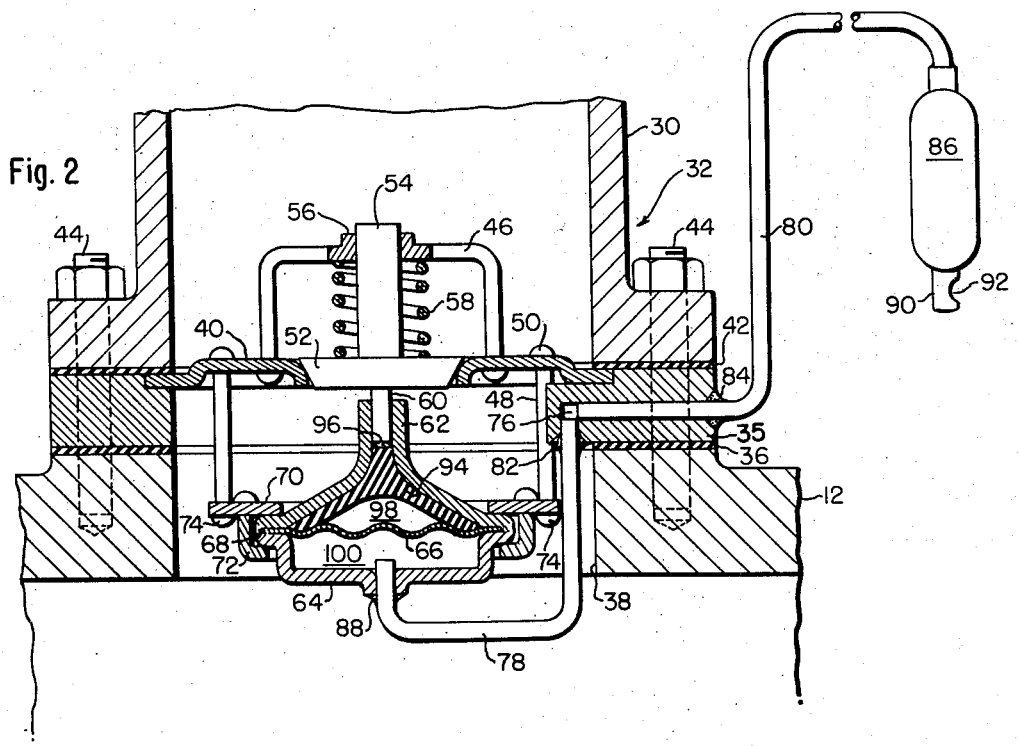

Other features of the invention reside in certain features of construction, combinations of the parts and modes of operation that will be readily understood from the following description of a preferred embodiment thereof, when considered with reference to the accompanying drawings in which Fig. 1 is a side elevation depicting various parts of an engine cooling system embodying the invention; and Fig. 2 is an elevation in section of the coolant circulation control valve and the thermostatic actuator therefor.

In Fig. 1 there is shown in schematic outline an engine block 12 of an automotive engine having an intake manifold 14, a carburetor 16, and an air filter 18. An air passage 20 leads from the air filter to the carburetor, where the fuel is mixed with the air in controlled proportion and passed through a throat 22 to the manifold 14.

The engine is also provided with a conventional cooling system in which a thermostatic valve according to the invention is employed. The system comprises a radiator 24 provided with a conventional pressure cap 26, a coolant pump 28, a water jacket forming an integral part of the engine block 12, and a return conduit 30 leading from the engine block to the top of the radiator 24. The conduit 30 is illustrated as being of metallic form, as indicated in Fig. 2, although it will be appreciated that other forms such as flexible, non-metallic hose may be used if desired.

The circulation of coolant fluid is in the conventional direction indicated by the arrows in Fig. 1. The rate of circulation depends upon the opening of a thermostatic valve 32 mounted in the upper opening of the engine block, and the pressure developed by the pump 28. The pump is normally coupled by a V-belt or other suitable means to a crank shaft 34; hence its speed is not influenced by thermostatic conditions.

The details of the valve structure are shown in Fig. 2. The essential parts are mounted upon a ring-shaped support member 35 which is mounted with a fluid-tight gasket 36 over the opening 38 in the engine block 12. The member 35 has an upper annular recess into which is received a seat member 40. The conduit 30 is fitted with a gasket 42 over the seat member 40, and bolts 44 are passed through the assembly and into suitably threaded holes in the engine block 12 to hold the parts firmly together in a fluid-tight manner.

The essential elements of the valve and pressure-motion transducer are supported upon the seat member 40 by means of suitable spiders 46 and 48. These spiders are provided with tabs such as 50 which are received through small slots punched in the seat member 40 and then twisted or bent over to prevent retraction through the slots.

A valve member 52 adapted to seat upon the member 40 has an integral stem portion 54 slidably received in a hub portion 56 of the spider 46. A compression spring 58 urges the valve member 52 to seat in the position indicated in the drawing.

A smooth metallic pin 60 bears upon the underside of the valve member 52, and is received within an extended tubular portion of a metallic actuator housing 62. The housing 62 is joined with a cup-shaped member 64, each member having an outwardly extended flange portion to match that of the other. Between these members is assembled a thin, imperforate, and preferably but not necessarily corrugated metallic diaphragm 66. The housing 62, the member 64 and the diaphragm 66 are joined together in such a manner as to provide a hermetic seal between the diaphragm and the member 64. In the illustrated embodiment the members 62, 64 and 66 are mutually fused together by an annular weld at 68. Alternatively, the members may be soldered or brazed, if desired; or, the diaphragm may be non-metallic, for example rubber, if a hermetic seal is not required to prevent leakage.

The welded assembly formed as described above is supported by the spider 46, for which purpose there is provided a ring-shaped member 70 and a spider 72, the member 70 being received upon and secured to the spider 46 by tabs such as 74.

The ring-shaped member 34 is provided with a passage 76 in which are received a pair of capillary tubes 78 and 80. These tubes are soldered to the member 34 as indicated at 82 and 84, respectively. The capillary 80 is terminated by a bulb 86 situated in the throat 20 between the air filter and the carburetor, to sense the ambient air temperature. Alternatively, the bulb 86 may be situated in any other suitable position as described in said application. The capillary 78 is soldered at 88 to the member 64.

The closed system constituted by the diaphragm 66, the member 64, the capillaries 78 and 80 and the bulb 86, is entirely filled with a thermal liquid that remains in the same state at all temperatures within the range from the lowest ambient temperature to the highest coolant temperature anticipated in operation. This fill, therefore, provides a substantially uniform thermal response to temperature, the total volume thereof being subjected partly to the ambient air temperature and partly to the coolant temperature.

It will be understood that the illustrated thermal liquid system is hermetically sealed, by which I mean that the metals of all joints and seals are actually fused together, since even a very small leakage of thermal liquid from the system would tend to have an appreciable effect on the over-all response. The system is preferably filled by placing it in an evacuation chamber, and admitting the thermal liquid after evacuation through a tube 90, which is thereafter crimped at 92 and soldered at its end, all in a conventional manner. This will permit the use of any thermal liquid. However, where this type of seal is unnecessary to prevent leakage of a particular thermal liquid or chemical attack on the diaphragm, the invention also contemplates the use of a rubber or other diaphragm, without a hermetic seal in the strict sense.

Within the housing 62 and above the diaphragm 66 is a body 94 of rubber or other similar deformable material. A wafer 96 is supported between the body 94 and the pin 60, and provides means to prevent the member 94 from tending to extrude under pressure out of the shell 62 around the sides of the pin 60. This wafer 96 is preferably fabricated of "Teflon" (a tetrafluoroethylene polymer), a tough, somewhat resilient material, or its equivalent.

Beneath the member 94 and filling the balance of the space within the housing 62 is a body 98 of wax or other equivalent crystalline solid having the property of marked thermal response throughout a predetermined transition range. In this range it is desired for the valve to operate from the open to the closed position if the ambient temperature has a predetermined "normal" value. For example, if we consider this "normal" temperature to be 70° F., then at this temperature the wax is permitted barely to open the valve at a coolant temperature of 140° F., and to cause it to become wide open at a coolant temperature of 170° F. In this case, the transition range through which the fill 98 changes from a solid to a liquid is approximately this same 30° range between 140° F. and 170° F.

It will be observed that the fill 98 and a portion of the liquid fill within the space 100 beneath the diaphragm are both subjected to the circulating coolant temperature. The volume of the space 100 bears a relation to the total volume of the liquid fill which is determined by the desired total response of the system for various ambient and coolant temperature conditions, as will be more fully evident from the following description of the operation.

In operation, the parts are arranged to have approximately the positions indicated in Fig. 2 when the engine is cold and the ambient temperature is at a "normal" value of, say, 70° F.

When the engine is started and the coolant temperature begins to rise, this rise is sensed by both the fill 98 and the portion of the liquid fill within the space 100. However, at temperatures below the transition range for the fill 98, the volumetric response is relatively slight and produces only a small movement of the valve member 52.

As the temperature of the coolant enters the transition range of the fill 98, the volumetric response becomes relatively large and causes an appreciable opening of the valve per degree of temperature change. When the coolant temperature reaches the upper limit of the transition range, the valve is preferably at or near its "full open" position.

The above operation at the "normal" ambient temperature is essentially similar to that of conventional wax-filled block thermostats, except for the additional, substantially linear, effect of the quantity of liquid fill within the space 100 beneath the diaphragm 66. This additional response does not appreciably alter the characteristic of the sytsem as one which responds principally in a predetermined transition range of coolant temperatures.

If, now, we assume that the engine is cold and that the ambient temperature is reduced to, say, zero degrees F., the diaphragm 66 will be deflected downwardly from the position illustrated in Fig. 2 because of the contraction of the thermal liquid. If the engine is now started, when the coolant temperature reaches the lower end of the transition range, the initial accelerated volumetric expansion of the fill 98 does not produce a responsive valve movement by reason of the inability of the body 94 to urge the pin 60 against the bottom of the valve. Depending upon the extent to which the diaphragm 66 was reflected downwardly from the illustrated position, the expansion of the body 98 may or may not be sufficient to start the valve open at any temperature within the transition range. If the valve does not start open within the transition range, the coolant temperature rises above the upper limit thereof, and the fully melted fill 98 responds in a manner substantially like that of a thermal liquid fill. While the rate of response of the wax is limited in this region, as for other liquid fills, it is sufficient eventually to overcome the above-described effects of the drop in ambient temperature, and to start the valve 52 open at a predetermined temperature well below the boiling point of the coolant.

It will be appreciated from the foregoing that, in case of a relatively low ambient temperature such as that assumed above, the response of the valve 52 after it starts open, in terms of linear movement per degree of temperature change, is relatively low, in addition to the fact that the valve does not start to open until a temperature is reached which is higher than the transition range of the fill 98. This, however, is not a serious handicap and is in fact desirable, since the coolant temperature as it leaves the radiatior 24 is relatively low and hence relatively more efficient in cooling the engine.

Conversely, if it is assumed that the ambient temperature rises above the "normal" value, the consequent upward deflection of the diaphragm 66 tends to cause the valve 52 to open at a temperature slightly below the lower limit of the transition range, thus permitting freer circulation of coolant, due to the fact that it is now at a relatively higher temperature as it leaves the radiator 24.

There is thus obtained, for the first time to my knowledge, a system which responds at normal ambient temperatures essentially like a conventional, sensitive wax-filled system, and yet which incorporates the desirable properties of ambient temperature compensation.

It will be appreciated that the embodiment of the thermostat herein described is for illustrative purposes only, and that numerous modifications in structure, design and relationships of the parts thereof will occur to those skilled in the art upon a reading of the foregoing specification in adapting the invention to specific applications. Such modifications, while retaining the essential features of the invention, are within the spirit and scope thereof.

Having thus described the invention, I claim:

1. A thermostatic control device for a circulating fluid having, in combination, a rigid shell having a sleeve bearing, an actuator member received in said bearing, a flexible metal diaphragm forming a wall to close the shell, a deformable body within the shell adjacent said actuator member, a body of wax-like crystalline material contiguous with said deformable body and adapted to change from the solid to the liquid state within the normal operating temperature range of said fluid, and means for deflecting said diaphragm including a metal member forming a closed space with the diaphragm, a metal capillary communicating with said space and extending to a space remote from said fluid, and a thermal liquid that remains in the same state throughout said range entirely filling the capillary and the communicating space adjacent the diaphragm, said liquid being sealed by fusion of the metal parts confining it.

2. A thermostatic control device for a circulating fluid having, in combination, a rigid metal enclosure situated in heat exchange relation to said fluid and having a sleeve bearing, an actuator pin received in said bearing, a flexible metal diaphragm supported within the enclosure in position to divide the space therein, a metal capillary communicating with the enclosure on the side of said diaphragm opposite to said bearing and extending to a space remote from said fluid, a thermal liquid that remains in the same state throughout the normal operating temperature range of said fluid entirely filling the capillary and the communicating space within the enclosure, said liquid being sealed by fusion of the metal parts confining it, a deformable body of limited compressibility within the enclosure adjacent said pin, and a body of wax-like crystalline material contiguous with said deformable body and adapted to change from the solid to the liquid state within the normal operating temperature range of said fluid.

3. A thermostatic control valve for a circulating fluid having, in combination, a valve seat, a valve member operatively associated with the seat, a rigid shell supported on the downstream side of the valve and having a sleeve bearing, an actuator member received in said bearing and engageable with the valve member, a flexible metal diaphragm forming a wall to close the shell, a deformable body within the shell adjacent said actuator member, a body of wax-like crystalline material contiguous with said deformable body and adapted to change from the solid to the liquid state within the normal operating temperature range of said fluid, and means for deflecting said diaphragm including a metallic member forming a closed space with the diaphragm, a metal capillary communicating with said space and extending to a space remote from said fluid, and a thermal liquid that remains in the same state throughout said range entirely filling the capillary and the communicating space adjacent the diaphragm, said liquid being hermetically sealed by fusion of the metal parts confining it.

4. An ambient temperature compensated thermostatic control valve for an engine coolant circulation system having, in combination, a valve seat and a valve in said system, a rigid shell supported on the downstream side of the valve and having a sleeve bearing, an actuator pin slidably received in said bearing and engageable with the valve member, a flexible metal diaphragm forming a wall to close the shell, a deformable body within the shell adjacent said pin, a body of wax-like crystalline material contiguous with said deformable body and adapted to change from the solid to the liquid state within the normal operating temperature range of said coolant, and means for deflecting said diaphragm including a metallic member forming a closed space with the diaphragm, a metal capillary communicating with said space and extending to a space outside the engine, and a thermal liquid entirely filling the capillary and the communicating space adjacent the diaphragm, said liquid being hermetically sealed by fusion of the metal parts confining it.

5. A thermostatic control device for a circulating fluid having, in combination, a rigid enclosure situated in heat exchange relation to said fluid and having a sleeve bearing, an actuator pin received in said bearing, a flexible diaphragm supported within the enclosure in position to divide the space therein, a capillary communicating with the enclosure on the side of said diaphragm opposite to said bearing and extending to a space remote from said fluid, a thermal liquid that remains in the same state throughout the normal operating temperature range of said liquid entirely filling the capillary and the communicating space within the enclosure, a deformable body of limited compressibility within the enclosure adjacent said pin, and a body of wax-like crystalline material contiguous with said deformable body and adapted to change from the solid to the liquid state within said normal operating temperature range.

References Cited in the file of this patent

UNITED STATES PATENTS

| | | |
|---|---|---|
| 386,557 | Roberts | July 24, 1888 |
| 2,101,369 | Jorgensen et al. | Dec. 7, 1937 |
| 2,101,735 | Fonseca | Dec. 7, 1937 |
| 2,268,083 | Rapuano | Dec. 30, 1941 |
| 2,453,851 | Miller | Nov. 16, 1948 |
| 2,636,776 | Vernet | Apr. 28, 1953 |